United States Patent
Ni

(10) Patent No.: US 9,323,391 B2
(45) Date of Patent: Apr. 26, 2016

(54) FLEXIBLE LIGHT SENSING FILM FOR FORMING ELECTRIC FIELDS TO BE CAPTURED BY A SENSING PANEL DEVICE

(71) Applicant: Wistron Corporation, New Taipei (TW)

(72) Inventor: Shyh-Jye Ni, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/521,442

(22) Filed: Oct. 22, 2014

(65) Prior Publication Data

US 2015/0277614 A1    Oct. 1, 2015

(30) Foreign Application Priority Data

Mar. 31, 2014  (TW) .............................. 103111987 A

(51) Int. Cl.
*G06F 3/042* (2006.01)
*G06F 3/044* (2006.01)

(52) U.S. Cl.
CPC ................ *G06F 3/042* (2013.01); *G06F 3/044* (2013.01); *G06F 2203/04102* (2013.01)

(58) Field of Classification Search
CPC .................................. G06F 3/042; G06F 3/044
USPC ......................................................... 345/175
See application file for complete search history.

(56) References Cited

U.S. PATENT DOCUMENTS

| | | | |
|---|---|---|---|
| 2011/0036648 A1 | 2/2011 | Chen | |
| 2011/0128428 A1* | 6/2011 | Takatoku | G06F 3/0412 348/307 |
| 2011/0279399 A1* | 11/2011 | Anderson | G06F 3/041 345/174 |
| 2012/0139835 A1* | 6/2012 | Morrison | G06F 3/0421 345/157 |
| 2012/0313867 A1* | 12/2012 | Luo | G02B 27/0093 345/173 |

* cited by examiner

*Primary Examiner* — Long D Pham
(74) *Attorney, Agent, or Firm* — Winston Hsu; Scott Margo

(57) ABSTRACT

An information capturing system includes a flexible light sensing film including a film and a plurality of light sensing elements configuring on the film for converting light to electric energy and storing the electric energy to form electric fields; and a sensing panel device for sensing the electric fields formed by the light sensing elements not shaded with a light shielding material on the flexible light sensing film to generate an electric field distributing situation, and capturing an information formed by the light shielding material on the flexible light sensing film according to the electric field distribution.

21 Claims, 5 Drawing Sheets

FLEXIBLE LIGHT SENSING FILM FOR FORMING ELECTRIC FIELDS TO BE CAPTURED BY A SENSING PANEL DEVICE

BACKGROUND OF THE INVENTION

1. Field of the Invention

The present invention relates to a flexible light sensing film, an information capturing system, and an information capturing method, and more particularly, to a flexible light sensing film, an information capturing system, and an information capturing method capable of allowing users to easily input information and quickly capture the information as digital data.

2. Description of the Prior Art

Conveniently, people usually record information, e.g., phone numbers of contacts or action items to do, on sticky notes and stick the sticky notes on some conspicuous place, for later reading the information recorded on the sticky notes. Meanwhile, as mobile devices such as smart phones or tablets become popular, many note programs are developed for the mobile devices to replace functions of the sticky notes, allowing a user to record information by handwriting input through a touch panel of a mobile device.

In such a situation, if the user is accustomed to record information on sticky notes, the recorded information on the sticky notes cannot be stored in the mobile device for being later accessed. If the user utilizes the touch panel of the mobile device to record the information, the user needs to accommodate a handwriting pattern of the touch panel so as to quickly input the information to the mobile device. In such a situation, how to allow the user to easily record the information on the sticky note anytime and save the information recorded on the sticky note as digital data in the mobile device for later accessing is a significant objective in the field.

SUMMARY OF THE INVENTION

It is therefore a primary objective of the present invention to provide a flexible light sensing film, an information capturing system, and an information capturing method, which are capable of allowing users easily to input information and quickly capturing the information as digital data.

An embodiment of the invention discloses an information capturing system, comprising a flexible light sensing film comprising a film; and a plurality of light sensing elements, disposed on the film, for converting light into electric energy, and storing the electric energy to form electric fields; and a sensing panel device, for sensing the electric fields formed by light sensing elements not covered with a light shielding material within the plurality of light sensing elements on the flexible light sensing film, and generating an electric field distribution, to capture an information formed by the light shielding material on the flexible light sensing film according to the electric field distribution.

An embodiment of the invention further discloses a flexible light sensing film, for an information capturing system, the flexible light sensing film comprising a film; and a plurality of light sensing elements, disposed on the film, for converting light into electric energy, and storing the electric energy to form electric fields; wherein a sensing panel device of the information capturing system senses the electric fields formed by the light sensing elements on the flexible light sensing film, and generates an electric field distribution, to capture an information on the flexible light sensing film according to the electric field distribution.

An embodiment of the invention further discloses an information capturing method, utilized in for an information capturing system comprising a flexible light sensing film and a sensing panel device, the information capturing method comprising forming an information on the flexible light sensing film through an light shielding material; disposing the flexible light sensing film on the sensing panel device; light sensing elements, which are not covered with the light shielding material within a plurality of light sensing elements on the flexible light sensing film, converting light into electric energy, and storing the electric energy to form electric fields; and the sensing panel device sensing the electric fields formed by the flexible light sensing film, generating an electric field distribution, and capturing the information formed by the light shielding material on the flexible light sensing film according to the electric field distribution.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
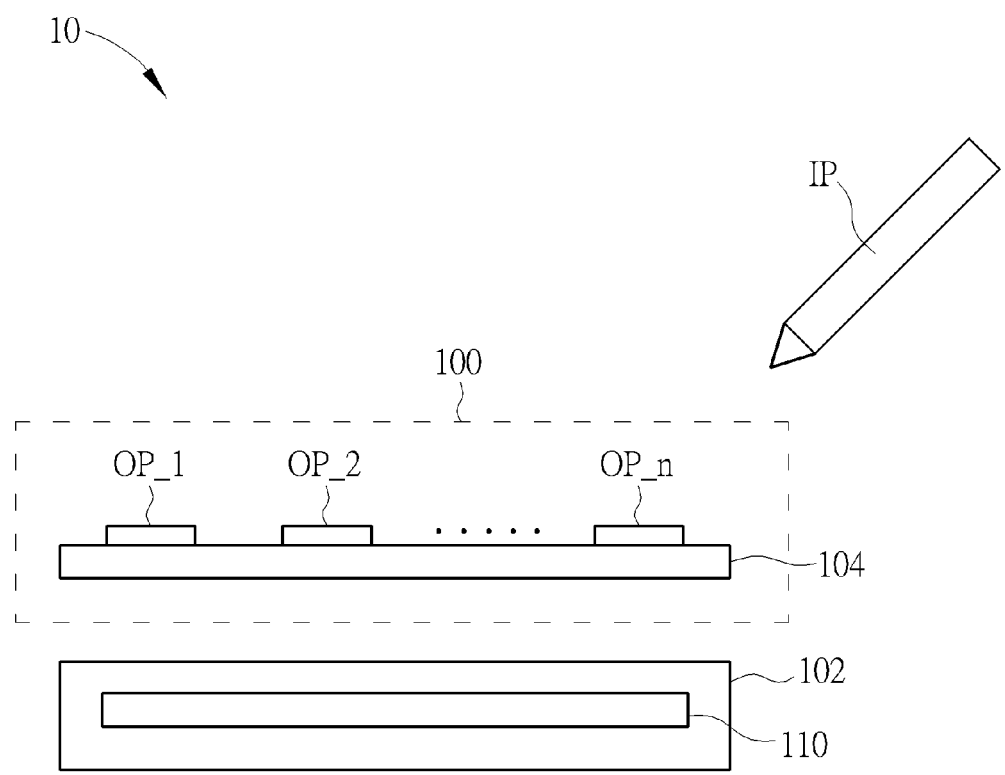
FIG. 1A is a schematic diagram of an information capturing system according to an embodiment of the invention.

Please refer to FIG. 1A, which is a schematic diagram of an information capturing system 10 according to an embodiment of the present invention. As shown in FIG. 1A, the information capturing system 10 comprises a flexible light sensing film 100 and a sensing panel device 102. The sensing panel device 102 may be an electronic device such as a tablet, a smart phone, etc., and comprises a capacitive sensing panel 110. When the sensing panel 110 is touched by a finger of a user, a plurality of electrodes arranged as a matrix inside the sensing panel 110 generate a variation in capacitance due to the user's electrostatic field, such that the sensing panel 110 generates electric current signals by sensing the variation in capacitance and performs analysis, to acquire a location coordinate of the finger touch on the sensing panel 110. The operational principle of the capacitive sensing panel 110 is known by those skilled in the art, which is not narrated herein for brevity.

Figure 1B:
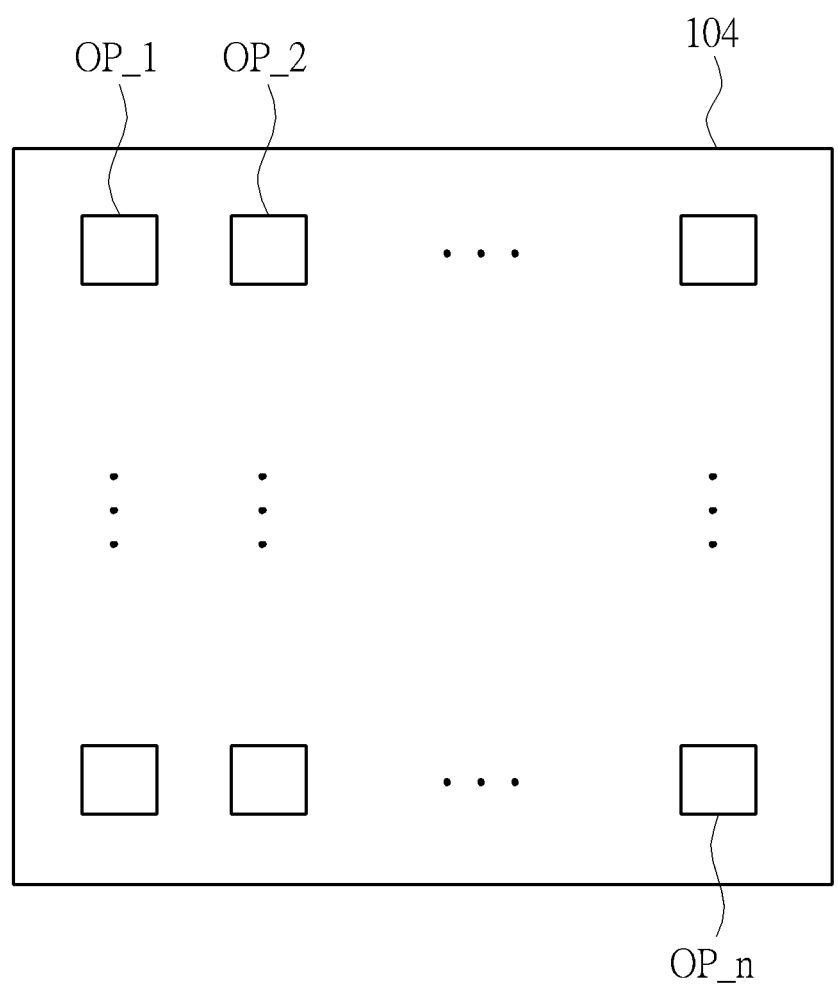
FIG. 1B is a schematic diagram of a front view of a flexible light sensing film in FIG. 1A.

Please refer to FIG. 1B. FIG. 1B is a schematic diagram of a front view of the flexible light sensing film 100 in FIG. 1A. As shown in FIGS. 1A-1B, the flexible light sensing film 100 comprises a film 104 and light sensing elements OP_1-OP_n. The film 104 is made of an organic material with a thickness between a single atom and several millimeters, such as plastic, paper, etc., and utilized as a bottom support of the flexible light sensing film 100 to allow the flexible light sensing film 100 to be flexible. The light sensing elements OP_1-OP_n are made of a semiconductor material with amorphous silicon or polycrystalline silicon, and disposed on the film 104. The method disposing the light sensing elements OP_1-OP_n on the film 104 can be direct sticking, layered coating, etc., but not limited herein. The light sensing elements OP_1-OP_n with the semiconductor material convert perceived light into electric energy, and store the electric energy to form electric fields.

In detail, the flexible light sensing film 100, like a sticky note, has flexible and lightweight characteristics. A user may draw information, such as pictures or text to be recorded, on the flexible light sensing film 100 through an input device IP (e.g., a marker pen). Hence, since the recorded information is formed on the flexible light sensing film 100 through a light shielding material outputted by the input device IP, a part of light sensing elements within the light sensing elements OP_1-OP_n are covered with the light shielding material. The rest of the light sensing elements, which are not covered with the light shielding material, may perceive the light, and convert the light into the electric energy, to form the electric fields.

In such a situation, the user may dispose the flexible light sensing film 100 with the recorded information on the sensing panel device 102. Under a situation that the light is on a top of the flexible light sensing film 100, the sensing panel device 102 senses a variation in capacitance caused by the electric fields generated by the internal light sensing elements which are not covered with the light shielding material, and generates an electric field distribution. Furthermore, the sensing panel device 102 analyzes the electric field distribution, to acquire location information of the light shielding material on the flexible light sensing film 100, for capturing the information recorded by the user as digital data (e.g. images, text, etc.).

In brief, the information capturing system 10 utilizes the flexible and light characteristics of the flexible light sensing film 100 (similar to the sticky note), and allows the user to easily write down the information to be recorded on the flexible light sensing film 100 through the input device IP, such as a marker pen. Meanwhile, the information capturing system 10 utilizes a characteristic of the flexible light sensing film 100, which is capable of converting the light into the electric energy, to sense the electric field distribution formed on the flexible light sensing film 100 through the sensing panel device 102, and analyzes the electric field distribution, to acquire the location information of the light shielding material formed on the flexible light sensing film 100, so as to capture the information recorded by the user as digital data and store the digital data in the sensing panel device 102. Therefore, the information capturing system 10 not only allows the user to easily input information on the flexible light sensing film 100, but also quickly captures the inputted information recorded by the user as the digital data, such that the user may access the information through the sensing panel device 102 later on.

Figure 2:
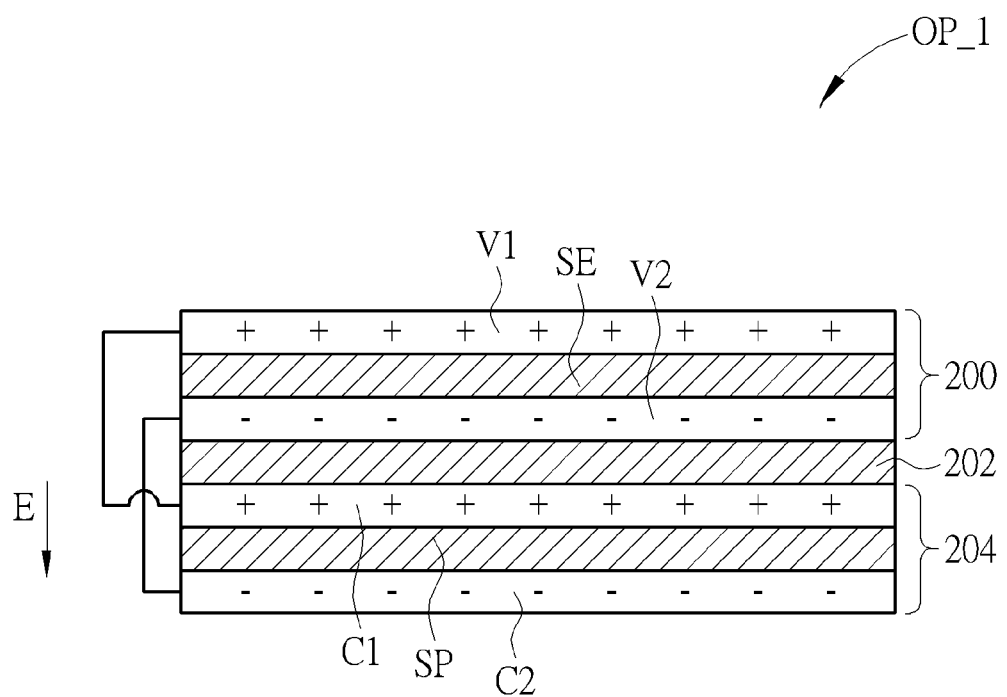
FIG. 2 is a structural diagram of a light sensing element in FIG. 1A or FIG. 1B.

On the other hand, a structure of each light sensing element of the light sensing elements OP_1-OP_n on the flexible light sensing film 100 may be the same. The light sensing element OP_1 is taken as an example to illustrate the detail structure of the light sensing element. Please refer to FIG. 2, which is a sectional structural diagram of the light sensing element OP_1 in FIG. 1A or FIG. 1B. As shown in FIG. 2, the sensing element OP_1 comprises a light sensing layer 200, an insulating layer 202 and an electric field layer 204. The light sensing layer 200 comprises a first electrode V1, a second electrode V2 and a semiconductor layer SE. The semiconductor layer SE is made of a semiconductor material with amorphous silicon or polycrystalline silicon, and capable of converting the perceived light into the electric energy, and outputting the electric energy with an electric potential difference through the first electrode V1 and the second electrode V2. Moreover, according to the photoelectric effect, the semiconductor material of the semiconductor layer SE converts the light into the electric energy. When the light is irradiated on the semiconductor, photons have actions on electrons of the semiconductor, causing flows of electrons. Therefore, by proper design of an energy level of the semiconductor material of the semiconductor layer SE, such that a frequency (i.e. energy) of the light exceeds a threshold value of the photoelectric effect, the semiconductor layer SE can convert light energy into electric current, and output the electric potential difference through the first electrode V1 and the second electrode V2. In FIG. 2, notations '+' and '−' represent a positive electric potential and a negative electric potential of the electric potential difference, respectively.

In addition, the electric field layer 204 comprises a first conductive layer C1, a second conductive layer C2 and an isolation layer SP. The first conductive layer C1 and the second conductive layer C2 are made of a transparent conducting material. The transparent conducting material can be indium tin oxide (ITO), antimony tin oxide (ATO), indium zinc oxide (IZO), aluminum zinc oxide (AZO), gallium zinc oxide (GZO), magnesium indium oxide (MIO), or a metal oxide selected from a metal oxide group composed of titanium, zinc, zirconium, antimony, indium, tin, aluminum, and silicon. The isolation layer SP is made of a nonconductive material, for isolating the first conductive layer C1 and the second conductive layer C2, such that the electric field layer 204 is formed as a capacitor structure, to store the electric energy outputted by the first electrode V1 and the second electrode V2 through the first conductive layer C1 and the second conductive layer C2 electrically connected to the first electrode V1 and the second electrode V2, respectively, and form an electric field E. In addition, the insulating layer 202 is also made of a nonconductive material, for insulating an electric conduction between the light sensing layer 200 and the electric field layer 204.

In other words, when the light sensing elements OP_1-OP_n are disposed on the film 104, the sensing elements within the sensing elements OP_1-OP_n, which are not covered with the light shielding material, convert the light into the electric energy through the light sensing layers, store the electric energy through the electric field layers, and form the electric fields. Thereby, if the flexible light sensing film 100 is disposed on the sensing panel device 102, the sensing panel device 102 may sense the electric fields formed by the sensing elements within the sensing elements OP_1-OP_n which are not covered with the light shielding material, and acquire the electric field distribution of the flexible light sensing film 100. Furthermore, the sensing panel device 102 analyzes the electric field distribution to quickly capture the information formed by the light shielding material as the digital data.

Figure 3:
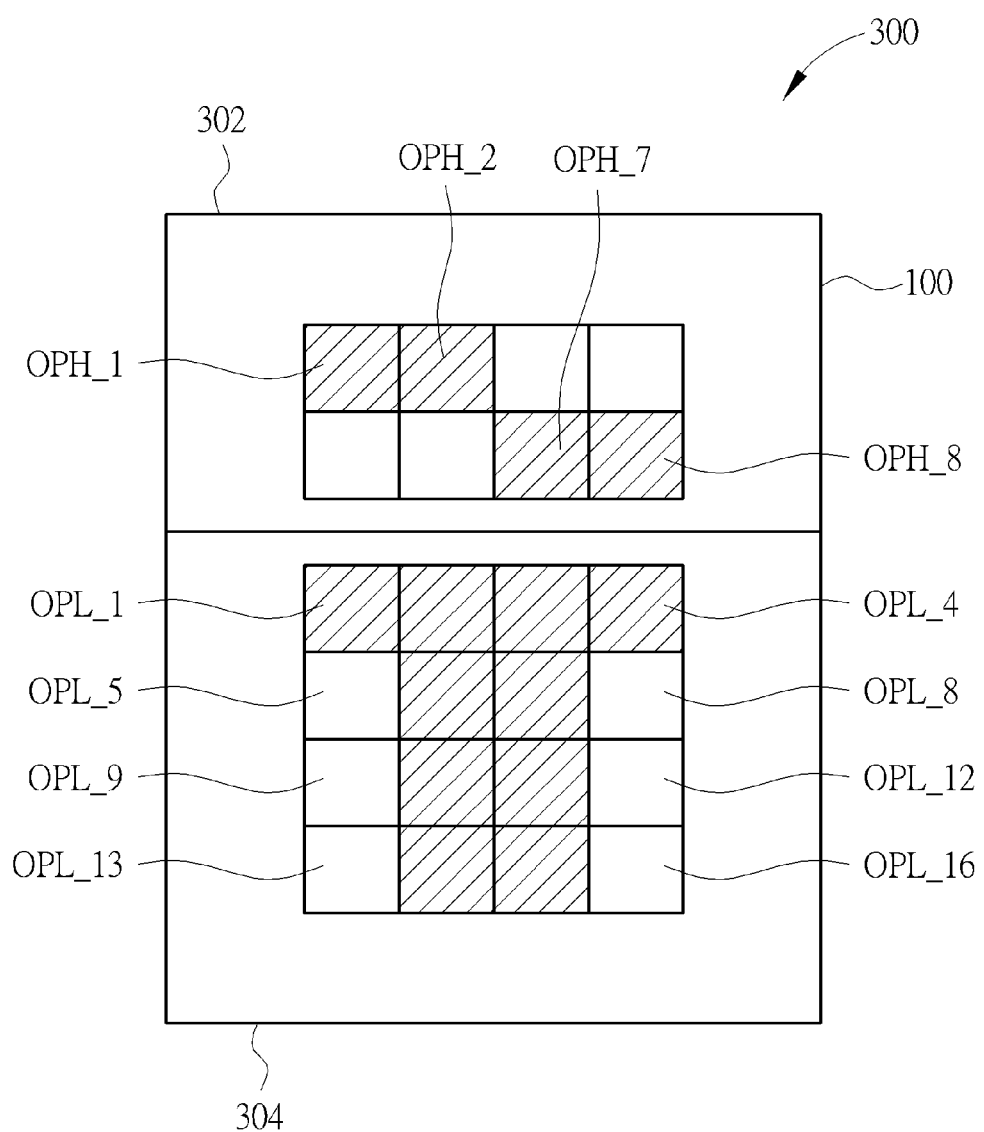
FIG. 3 is a schematic diagram of a flexible light sensing film according to another embodiment of the invention.

Notably, dispositions or arrangements of the light sensing elements OP_1-OP_n in the flexible light sensing film 100 may be modified accordingly, but not limited herein. For example, please refer to FIG. 3, which is a schematic diagram of a flexible light sensing film 300 according to another embodiment of the present invention. As shown in FIG. 3, the flexible light sensing film 300 is divided into a header zone 302 and an input zone 304. The header zone 302 comprises the light sensing elements OPH_1-OPH_8, and the input zone 304 comprises the light sensing elements OPL_1-OPL_16. For brevity, only a part of the light sensing elements are denoted in FIG. 3.

In detail, in the header zone 302, the light sensing elements OPH_1-OPH_2, OPH_7-OPH_8 (represented as squares with slash lines in FIG. 3) are identifying elements of the flexible light sensing film 300, which are covered with a material in advance and perceive no light for converting into electric field. Thereby, when the flexible light sensing film 300 is disposed on the sensing panel device 102, since only the light sensing elements OPH_3-OPH_6 are capable of converting the light into the electric field in the header zone 302, the sensing panel device 102 may sense the header zone 302 of the flexible light sensing film 300, and acquire location information of the light sensing elements OPH_1-OPH_2, OPH_7-OPH_8 as an identifying information for triggering to capture the information. In such a situation, the sensing panel device 102 determines whether to perform sensing of the electric fields on the light sensing elements OPL_1-OPL_16 in the input zone 304 and capturing of the information according to the identifying information. In other words, when the identifying information indicates that the electric fields formed by the light sensing elements OPH_1-OPH_8 in the header zone 302 are correct, the sensing panel device 102 is allowed to capture the information on the input zone 304. Therefore, the sensing panel device 102 determines whether to trigger to capture the information through the identifying elements of the flexible light sensing film 300, to avoid wrong actions of the sensing panel device 102 caused by instantaneous and unstable electric fields of the flexible light sensing film 300 when the flexible light sensing film 300 is just disposed on the sensing panel device 102 at the beginning.

After the sensing panel device 102 determines that the identifying information is correct, the sensing panel device 102 performs sensing on the input zone 304, acquires the electric field distribution formed by the light sensing elements OPL_5, OPL_8-OPL_9, OPL_12-OPL_13, OPL_16 (represented as squares without slash lines in FIG. 3), which are not covered with the light shielding material, and analyzes the electric field distribution to capture the information formed by the light shielding material, which is a picture in T-shape formed by squares with slash lines shown in FIG. 3, or to capture the information as a text data, e.g., a letter T.

In brief, the flexible light sensing film 300 may further comprise the light sensing elements covered with the material in advance as the identifying elements. After the sensing panel device 102 senses and acquires the identifying information, the sensing panel device 102 then determines whether to sense the flexible light sensing film 300 and capture the information, to avoid the sensing panel device 102 being affected by the instantaneous and unstable electric fields of the flexible light sensing film 300, which causes the wrong actions.

Figure 4:
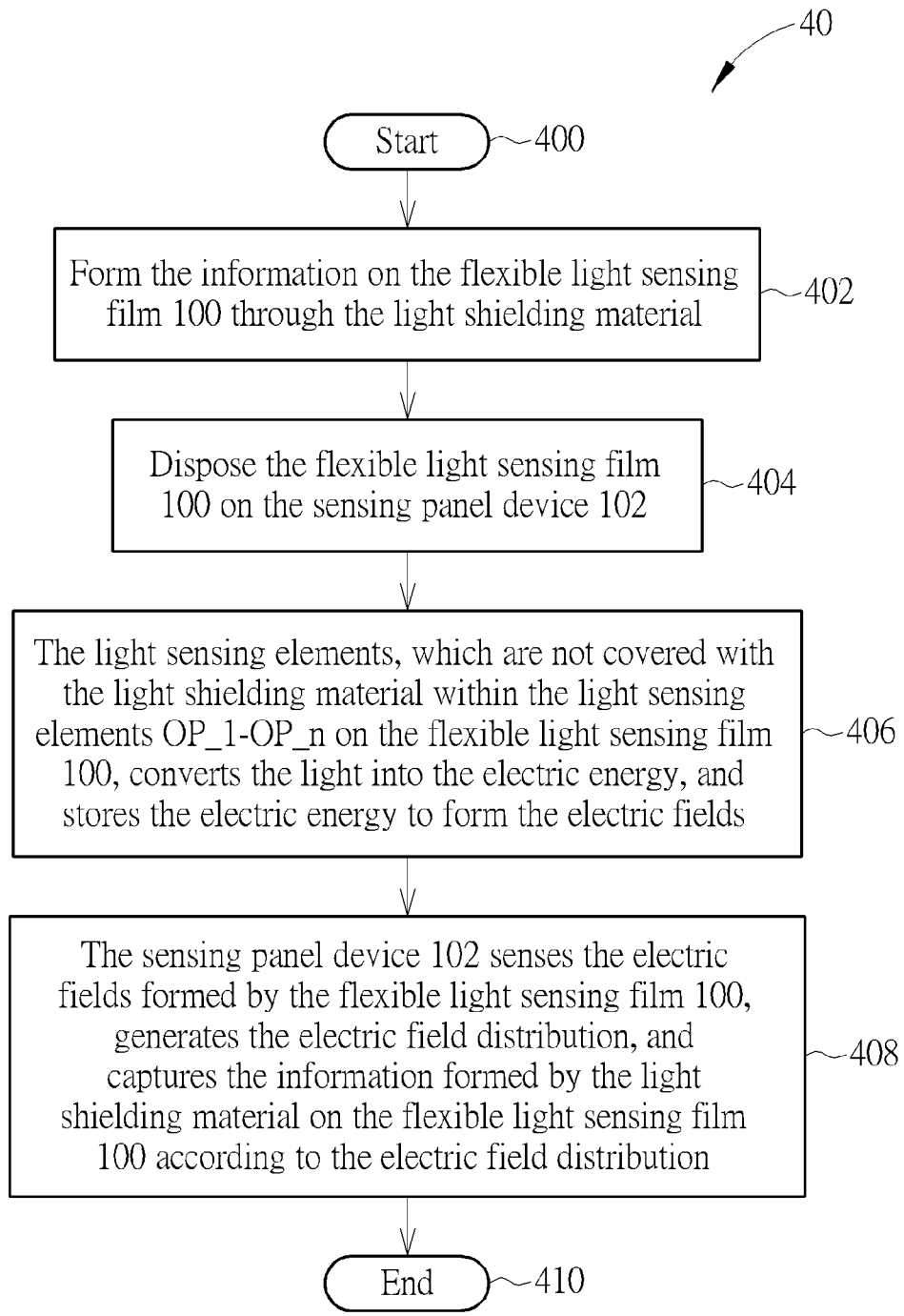
FIG. 4 is a schematic diagram of an information capturing process according to an embodiment of the invention.

The method of the information capturing system 10 capturing the information can be further summarized into an information capturing process 40. The information capturing process 40 is executed by the information capturing system 10. As shown in FIG. 4, the information capturing process 40 comprises following steps:

Step 400: Start.

Step 402: Form the information on the flexible light sensing film 100 through the light shielding material.

Step 404: Dispose the flexible light sensing film 100 on the sensing panel device 102.

Step 406: The light sensing elements, which are not covered with the light shielding material within the light sensing elements OP_1-OP_n on the flexible light sensing film 100, converts the light into the electric energy, and stores the electric energy to form the electric fields.

Step 408: The sensing panel device 102 senses the electric fields formed by the flexible light sensing film 100, generates the electric field distribution, and captures the information formed by the light shielding material on the flexible light sensing film 100 according to the electric field distribution.

Step 410: End.

The details of each step of the information capturing process 40 can be referred to the relative paragraphs of the embodiments stated above, and are not narrated herein for brevity. Through the information capturing process 40, the sensing panel device 102 quickly captures the information inputted by the user on the flexible light sensing film 100 as the digital data and stores the digital data in the sensing panel device 102, such that the user may access the information later through the sensing panel device 102.

Specifically, the information capturing system 10 of the present invention allows the user to easily write down the information to be recorded on the flexible light sensing film 100 with the flexible and lightweight characteristics, converts the light into the electric energy through the flexible light sensing film 100, senses the electric field distribution generated by the light sensing elements not covered with the light shielding material on the flexible light sensing film 100 through the sensing panel device 102, and analyzes the electric field distribution to capture the information formed by the light shielding material on the flexible light sensing film 100 as the digital data. Those skilled in the art may make alternations and modifications accordingly. For example, in the embodiment, the light sensing elements OP_1-OP_n are arranged in a matrix arrangement, such that the electrodes in the matrix arrangement within the sensing panel 110 generate the variation in capacitance due to the electric fields formed by the light sensing elements OP_1-OP_n, and the sensing panel 110 senses the electric field distribution on the flexible light sensing film 100. However, in other embodiments, the light sensing elements OP_1-OP_n may be arranged in a concentric circle manner or in a scattering fashion, which is not limited herein. In addition, in the embodiment, the light sensing elements OP_1-OP_n have same sizes and are all squares. In other embodiments, the light sensing elements OP_1-OP_n may have different sizes and shapes. For example, the size and the shapes of the light sensing elements OP_1-OP_n may be determined according to locations of the light sensing elements OP_1-OP_n on the flexible light sensing film 100, or be accommodated to a sensing structure of the sensing panel device 102, such that the sensing panel device 102 may more accurately sense the electric field distribution which is formed by the light sensing elements not covered with the light shielding material on the flexible light sensing film 100.

In summary, when the user utilizes the sticky notes to record the information, the recorded information cannot become digital data directly and cannot be stored in electronic devices. The information capturing system of the present invention comprises the flexible light sensing film, which is flexible and capable of converting the light into the electric energy, allowing the user to record the information on the flexible light sensing film, and captures the information on the flexible light sensing film as the digital data. Thereby, the user may easily record the information anytime and quickly capture the recorded information as the digital data, which is stored in the electronic device, for being conveniently accessed later on.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An information capturing system, comprising:
a flexible light sensing film, comprising:
a film; and
a plurality of light sensing elements, disposed on the film, for converting light into electric energy, and storing the electric energy to form electric fields; and
a sensing panel device, for sensing the electric fields formed by light sensing elements not covered with a light shielding material within the plurality of light sensing elements on the flexible light sensing film, and generating an electric field distribution, to capture an information formed by the light shielding material on the flexible light sensing film according to the electric field distribution.

2. The information capturing system of claim 1, wherein each of the plurality of light sensing elements comprises:
a light sensing layer, for converting the light into the electric energy, and outputting the electric energy by a first electrode and a second electrode;
an electric field layer, comprising a first conductive layer coupled to the first electrode and a second conductive layer coupled to the second electrode, for storing the electric energy outputted by the first electrode and the second electrode, to form the electric field between the first conductive layer and the second conductive layer; and
an insulating layer, for isolating the light sensing layer and the electric field layer.

3. The information capturing system of claim 2, wherein the light sensing layer is made of a semiconductor material with amorphous silicon or polycrystalline silicon, to convert the light into the electric energy.

4. The information capturing system of claim 2, wherein the first conductive layer and the second conductive layer are made of a transparent conducting material, and the transparent conducting material comprises indium tin oxide (ITO), antimony tin oxide (ATO), indium zinc oxide (IZO), aluminum zinc oxide (AZO), gallium zinc oxide (GZO), magnesium indium oxide (MIO), or a metal oxide selected from a metal oxide group composed of titanium, zinc, zirconium, antimony, indium, tin, aluminum, and silicon.

5. The information capturing system of claim 1, wherein the plurality of light sensing elements further comprise:
a plurality of identifying elements, covered with a material in advance, perceiving no light for converting into electric field.

6. The information capturing system of claim 5, wherein the sensing panel device senses the flexible light sensing film, and acquires location information of the plurality of identifying elements which have no electric field, as an identifying information for triggering to capture the information.

7. The information capturing system of claim 1, wherein the sensing panel device comprises a capacitive sensing panel, and the capacitive sensing panel senses a variation in capacitance caused by the electric fields on the flexible light sensing film, to generate the electric field distribution.

8. The information capturing system of claim 1, wherein the sensing panel device analyzes the electric field distribution, and acquires location information of the light sensing elements not covered with the light shielding material on the flexible light sensing film, to analyze and obtain the information formed by the light shielding material on the flexible light sensing film.

9. The information capturing system of claim 1, wherein a user forms the light shielding material on the flexible light sensing film through an input device, to record the information.

10. A flexible light sensing film, for an information capturing system, the flexible light sensing film comprising:
a film; and
a plurality of light sensing elements, disposed on the film, for converting light into electric energy, and storing the electric energy to form electric fields;
wherein a sensing panel device of the information capturing system senses the electric fields formed by the light sensing elements on the flexible light sensing film, and generates an electric field distribution, to capture an information on the flexible light sensing film according to the electric field distribution.

11. The flexible light sensing film as claim 10, wherein the sensing panel device senses the electric fields formed by light sensing elements not covered with a light shielding material within the plurality of light sensing elements on the flexible light sensing film, and generates the electric field distribution, to capture the information formed by the light shielding material on the flexible light sensing film according to the electric field distribution.

12. The flexible light sensing film as claim 11, wherein each of the plurality of light sensing elements comprises:
a light sensing layer, for converting the light into the electric energy, and outputting the electric energy by a first electrode and a second electrode;
an electric field layer, comprising a first conductive layer coupled to the first electrode and a second conductive layer coupled to the second electrode, for storing the electric energy outputted by the first electrode and the second electrode, to form the electric field between the first conductive layer and the second conductive layer; and
an insulating layer, for isolating the light sensing layer and the electric field layer.

13. The flexible light sensing film as claim 12, wherein the light sensing layer is made of a semiconductor material with amorphous silicon or polycrystalline silicon, to convert the light into the electric energy.

14. The flexible light sensing film as claim 12, wherein the first conductive layer and the second conductive layer are made of a transparent conducting material, and the transparent conducting material comprises indium tin oxide (ITO), antimony tin oxide (ATO), indium zinc oxide (IZO), aluminum zinc oxide (AZO), gallium zinc oxide (GZO), magnesium indium oxide (MIO), or a metal oxide selected from a metal oxide group composed of titanium, zinc, zirconium, antimony, indium, tin, aluminum, and silicon.

15. The flexible light sensing film as claim 11, wherein the plurality of light sensing elements further comprise:
a plurality of identifying elements, covered with a material in advance, perceiving no light for converting into electric field.

16. An information capturing method, utilized for an information capturing system comprising a flexible light sensing film and a sensing panel device, the information capturing method comprising:
forming an information on the flexible light sensing film through an light shielding material;
disposing the flexible light sensing film on the sensing panel device;
light sensing elements, which are not covered with the light shielding material within a plurality of light sensing elements on the flexible light sensing film, converting light into electric energy, and storing the electric energy to form electric fields; and the sensing panel device sensing the electric fields formed by the flexible light sensing film, generating an electric field distribution, and capturing the information formed by the light shielding material on the flexible light sensing film according to the electric field distribution.

17. The information capturing method of claim 16, wherein each of the plurality of light sensing elements comprises:

a light sensing layer, for converting the light into the electric energy, and outputting the electric energy by a first electrode and a second electrode;

an electric field layer, comprising a first conductive layer coupled to the first electrode and a second conductive layer coupled to the second electrode, for storing the electric energy outputted by the first electrode and the second electrode, to form the electric field between the first conductive layer and the second conductive layer; and an insulating layer, for isolating the light sensing layer and the electric field layer.

18. The information capturing method of claim 16, wherein the plurality of light sensing elements further comprise:

a plurality of identifying elements, covered with a material in advance, perceiving no light for converting into electric field.

19. The information capturing method of claim 18, wherein the sensing panel device senses the flexible light sensing film, and acquires location information of the plurality of identifying elements which have no electric field, as an identifying information for triggering to capture the information.

20. The information capturing method of claim 16, wherein the sensing panel device acquires location information of the light sensing elements not covered with the light shielding material on the flexible light sensing film according to the electric field distribution, to analyze and obtain the information formed by the light shielding material on the flexible light sensing film.

21. The information capturing method of claim 16, wherein a user forms the light shielding material on the flexible light sensing film through an input device, to record the information.

* * * * *